(12) United States Patent
Terpstra

(10) Patent No.: US 9,020,105 B2
(45) Date of Patent: Apr. 28, 2015

(54) SYSTEMS AND METHODS FOR THIRD PARTY EMERGENCY CALL TERMINATION

(75) Inventor: Richard D. Terpstra, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 12/795,590

(22) Filed: Jun. 7, 2010

(65) Prior Publication Data

US 2010/0248683 A1      Sep. 30, 2010

Related U.S. Application Data

(63) Continuation of application No. 11/009,212, filed on Dec. 9, 2004, now Pat. No. 7,734,019.

(51) Int. Cl.
| | | |
|---|---|---|
| *H04M 11/04* | (2006.01) | |
| *H04M 3/42* | (2006.01) | |
| *H04W 76/00* | (2009.01) | |
| *H04M 7/12* | (2006.01) | |

(52) U.S. Cl.
CPC ........ *H04M 3/42348* (2013.01); *H04W 76/007* (2013.01); *H04M 3/42059* (2013.01); *H04M 7/123* (2013.01); *H04M 2242/04* (2013.01)

(58) Field of Classification Search
USPC ............ 379/45, 49, 37, 221.1, 221.13, 88.22; 455/436, 442, 432.1; 370/352; 709/220
See application file for complete search history.

(56) References Cited

U.S. PATENT DOCUMENTS

| | | | |
|---|---|---|---|
| 5,742,666 A * | 4/1998 | Alpert ........................ 455/404.2 | |
| 5,774,668 A | 6/1998 | Choquier et al. | |
| 5,812,769 A | 9/1998 | Graber et al. | |
| 5,819,092 A | 10/1998 | Ferguson et al. | |
| 5,920,701 A | 7/1999 | Miller et al. | |
| 5,956,716 A | 9/1999 | Kenner et al. | |
| 6,052,718 A | 4/2000 | Gifford | |
| 6,078,943 A | 6/2000 | Yu | |
| 6,081,835 A | 6/2000 | Antcliff | |
| 6,108,703 A | 8/2000 | Leighton et al. | |
| 6,112,239 A | 8/2000 | Kenner et al. | |
| 6,138,026 A | 10/2000 | Irvin | |
| 6,154,744 A | 11/2000 | Kenner et al. | |
| 6,167,427 A | 12/2000 | Rabinovich et al. | |
| 6,175,869 B1 | 1/2001 | Ahuja et al. | |
| 6,178,160 B1 | 1/2001 | Bolton | |

(Continued)

FOREIGN PATENT DOCUMENTS

| | | | |
|---|---|---|---|
| EP | 1307018 A1 | 5/2003 | |
| JP | 10307783 A1 | 11/1998 | |

(Continued)

OTHER PUBLICATIONS

European Examination Report, dated Sep. 19, 2012, Application No. 05744499.4, 5 pgs.

(Continued)

*Primary Examiner* — Maria El-Zoobi

(57) ABSTRACT

Various systems and methods for servicing emergency calls are disclosed. One such method includes providing a location database that includes physical location information about a communication device. This location information can be accessed either directly or indirectly by an emergency service answering system, while concealing the information from a network responsible for terminating the call.

14 Claims, 8 Drawing Sheets

(56) References Cited

U.S. PATENT DOCUMENTS

| | | |
|---|---|---|
| 6,185,601 B1 | 2/2001 | Wolff |
| 6,185,619 B1 | 2/2001 | Joffe et al. |
| 6,243,760 B1 | 6/2001 | Armbruster et al. |
| 6,314,465 B1 | 11/2001 | Paul et al. |
| 6,330,605 B1 | 12/2001 | Christensen et al. |
| 6,374,299 B1 | 4/2002 | Ford et al. |
| 6,412,002 B1 | 6/2002 | Denman et al. |
| 6,412,004 B1 | 6/2002 | Chen et al. |
| 6,438,652 B1 | 8/2002 | Jordan et al. |
| 6,484,204 B1 | 11/2002 | Rabinovich |
| 6,574,612 B1 | 6/2003 | Baratti et al. |
| 6,601,084 B1 | 7/2003 | Bhaskaran et al. |
| 6,606,643 B1 | 8/2003 | Emens et al. |
| 6,636,499 B1 | 10/2003 | Dowling |
| 6,665,702 B1 | 12/2003 | Zisapel et al. |
| 6,678,357 B2 | 1/2004 | Stumer et al. |
| 6,687,731 B1 | 2/2004 | Kavak |
| 6,722,211 B1 | 4/2004 | Ciobanu et al. |
| 6,760,775 B1 | 7/2004 | Anerousis et al. |
| 6,778,496 B1 | 8/2004 | Meempat et al. |
| 6,795,858 B1 | 9/2004 | Jain et al. |
| 6,845,092 B2 | 1/2005 | Vassilovski et al. |
| 6,857,021 B1 | 2/2005 | Schuster et al. |
| 6,886,035 B2 | 4/2005 | Wolff |
| 6,938,031 B1 | 8/2005 | Zoltan et al. |
| 6,963,557 B2 | 11/2005 | Knox |
| 7,000,016 B1 | 2/2006 | Vanderbeck et al. |
| 7,031,728 B2 | 4/2006 | Beyer, Jr. |
| 7,076,541 B1 | 7/2006 | Burstein et al. |
| 7,088,718 B1 | 8/2006 | Srivastava |
| 7,103,645 B2 | 9/2006 | Leighton et al. |
| 7,103,647 B2 | 9/2006 | Aziz |
| 7,110,393 B1 | 9/2006 | Tripathi et al. |
| 7,111,052 B1 | 9/2006 | Cook |
| 7,136,651 B2 | 11/2006 | Kalavade |
| 7,151,753 B2 | 12/2006 | Chaney et al. |
| 7,177,399 B2 | 2/2007 | Dawson et al. |
| 7,194,552 B1 | 3/2007 | Schneider |
| 7,292,853 B2 | 11/2007 | Nam et al. |
| 7,308,481 B2 | 12/2007 | Takamoto et al. |
| 7,328,281 B2 * | 2/2008 | Takeda et al. ................. 709/246 |
| 7,333,459 B2 | 2/2008 | Feyerabend et al. |
| 7,342,928 B2 | 3/2008 | Boulay et al. |
| 7,379,458 B2 | 5/2008 | Inoue et al. |
| 7,412,521 B2 | 8/2008 | Olson et al. |
| 8,089,972 B2 | 1/2012 | Terpstra et al. |
| 2001/0042139 A1 | 11/2001 | Jeffords et al. |
| 2002/0031107 A1 | 3/2002 | Li |
| 2002/0032777 A1 | 3/2002 | Kawata et al. |
| 2002/0078209 A1 | 6/2002 | Peng |
| 2002/0078263 A1 | 6/2002 | Darling et al. |
| 2002/0141401 A1 | 10/2002 | Albert et al. |
| 2002/0166117 A1 | 11/2002 | Abrams et al. |
| 2002/0194335 A1 | 12/2002 | Maynard |
| 2002/0194342 A1 | 12/2002 | Lu et al. |
| 2003/0007622 A1 | 1/2003 | Kalmanek |
| 2003/0009559 A1 | 1/2003 | Ikeda |
| 2003/0012344 A1 | 1/2003 | Agarwal et al. |
| 2003/0041108 A1 | 2/2003 | French et al. |
| 2003/0050051 A1 | 3/2003 | Vilander |
| 2003/0065761 A1 | 4/2003 | Cereja et al. |
| 2003/0105865 A1 | 6/2003 | McCanne et al. |
| 2003/0108000 A1 | 6/2003 | Chaney et al. |
| 2003/0110257 A1 | 6/2003 | Hyun et al. |
| 2003/0156577 A1 | 8/2003 | Dunlap et al. |
| 2004/0143662 A1 | 7/2004 | Poyhonen et al. |
| 2004/0152469 A1 | 8/2004 | Yla-Outinen et al. |
| 2004/0160947 A1 | 8/2004 | Hardy et al. |
| 2004/0205192 A1 | 10/2004 | Olson et al. |
| 2004/0264481 A1 | 12/2004 | Darling et al. |
| 2005/0010653 A1 | 1/2005 | McCanne |
| 2005/0022203 A1 | 1/2005 | Zisapel et al. |
| 2005/0044141 A1 | 2/2005 | Hameleers et al. |
| 2005/0055435 A1 | 3/2005 | Gbadegesin et al. |
| 2005/0085257 A1 | 4/2005 | Laird et al. |
| 2005/0091407 A1 | 4/2005 | Vaziri et al. |
| 2005/0101327 A1 | 5/2005 | Nam et al. |
| 2005/0136925 A1 | 6/2005 | Yamauchi |
| 2005/0169438 A1 | 8/2005 | Binning |
| 2005/0197767 A1 | 9/2005 | Nortrup |
| 2005/0213716 A1 * | 9/2005 | Zhu et al. ........................ 379/45 |
| 2006/0013147 A1 | 1/2006 | Terpstra et al. |
| 2006/0056388 A1 | 3/2006 | Livingood |
| 2006/0064478 A1 | 3/2006 | Sirkin |
| 2006/0069776 A1 | 3/2006 | Shim et al. |
| 2006/0112170 A1 | 5/2006 | Sirkin |
| 2006/0235980 A1 | 10/2006 | Pote et al. |
| 2006/0265467 A1 | 11/2006 | Jang |
| 2007/0254625 A1 * | 11/2007 | Edge .......................... 455/404.1 |
| 2009/0070406 A1 | 3/2009 | Terpstra et al. |

FOREIGN PATENT DOCUMENTS

| | | |
|---|---|---|
| WO | WO-9857275 A3 | 12/1998 |
| WO | WO-9940514 A1 | 8/1999 |
| WO | WO-01/52497 A2 | 7/2001 |
| WO | WO-03105439 A1 | 12/2003 |

OTHER PUBLICATIONS

"Cisco DistributedDirector", Cisco Systems, Inc. 1996, 9 pgs.

"European Search Report dated May 17, 2011", counterpart European Application No. 05744499.4, 5 pgs.

"European Supplementary Search Report dated Feb. 2, 2011,", counterpart European Application No. 05744499.4, 4 pgs.

"International Searching Authority", U.S. Patent and Trademark Office and Receiving Office, International Search Report (Form PCT/ISA/210) for international application No. PCT/US05/15260 Oct. 27, 2005, 3.

"International Searching Authority", US Patent and Trademark Office and Receiving Office, Written Opinion of the International Searching Authority (Form PCT/ISA/237) for international application No. PCT/US05/15260 Oct. 27, 2005, 3.

"NAT Traversal and VoIP: The Challenge to Peer-to-Peer Internel Communication", retrieved at http'//msdn.microsoft.com/en-us/librarylbb330896(PRINTER)_aspxon_08_July_2008 Microsoft Corporation Mar. 24, 2008, 11.

"U.S. Appl. No. 11/009,216, filed Dec. 9, 2004", "Systems and Methods for Locating Endpoints in a Communication Network", 36 pgs.

"U.S. Appl. No. 13/336,813, filed Dec. 23, 2011", "Registration Redirect Server", 40 pgs.

Almeroth, K. et al., "Scalable Delivery of Web Pages Using Cyclic Best-Effort (UDP) Multicast",*IEEE INFOCOM* San Francisco, California, USA Jun. 1998, pp. 1-24.

Baentsch, M. et al., "Introducing Application-Level Replication and Naming into Today's Web", *Computer Networks and ISDN Systems* vol. 28, Nos. 7-11 May 1996, pp. 921-930.

Berners-Lee, T. et al., "Hypertext Markup Language—2.0", *Internet Engineering Task Force (IETF) Request for Comments (RFC) 1866* Nov. 1995, pp. 1-77.

Berners-Lee, T. et al., "Hypertext Transfer Protocol—HTTP/1.0", *Internet Engineering Task Force (IETF) Request for Comments (RFC) 1945* May 1996, pp. 1-60.

Berners-Lee, T. et al., "Hypertext Transfer Protocol—HTTP/1.0", *Internet Engineering Task Force (IETF)* Internet Draft, draft-ietf-http-v10-spec-00.ps. Mar. 1995, pp. 1-59.

Berners-Lee, T. et al., "Uniform Resource Locators", *RFC 1738* Dec. 1994, pp. 1-25.

Berners-Lee, T., "Univeral Resource Identifiers in WWW: A Unifying Syntax for the Expression of Names and Addresses of Objects on the Network as Used in the World-Wide Web", *Internet Engineering Task Force (IETF) Request for Comments (RFC) 1630* Jun. 1994, pp. 1-28.

Bestavros, A., "Demand-Based Document Dissemination to Reduce Traffic and Balance Load in Distributed Information Systems", *IEEE Symposium on Parallel and Distributed Processing* San Antonio, TX Oct. 1995, 8 pgs.

(56) References Cited

OTHER PUBLICATIONS

Bhattacharjee, S. et al., "Application-Layer Anycasting", *in Proc. IEEE INFOCOM '97* Apr. 1997, 9 pgs.

Brisco, T., "DNS Support for Load Balancing", *IETF RFC 1794* Apr. 1995, pp. 1-7.

Callon, R., "Use of OSI IS-IS for Routing in TCP/IP and Dual Environments", *Internet Engineering Task Force (IETF) Request for Comments (RFC) 1195* Dec. 1990, pp. 1-85.

Chandra, R. et al., "BGP Communities Attribute", *Internet Engineering Task Force (IETF) Request for Comments (RFC) 1997* Aug. 1996, pp. 1-5.

Chen, E. et al., "An Application of the BGP Community Attribute in Multi-home Routing", *Internet Engineering Task Force (IETF) Request for Comments (RFC) 1998* Aug. 1996, pp. 1-9.

Colajanni, M. et al., "Scheduling Algorithms for Distributed Web Servers", *Intl Conf. on Distributed Computing Systems (ICDCS)* Baltimore, Maryland, USA May 1997, pp. 169-176.

Collins, A., "The Detour Framework for packet Rerouting", University of Washington; http://web.archive.org/web/19990202122310/http://www.cs/washington.edu/research/networking/detour/ Oct. 29, 1998, pp. 1-20.

Eriksson, H., "MBONE: The Multicast Backbone", *Communications of the ACM* vol. 37, No. 8 Aug. 1994, pp. 54-60.

Fielding, R. et al., "Hypertext Transfer Protocol—HTTP/1.1", *Internet Engineering Task Force (IETF) Request for Comments (RFC) 2068* Jan. 1997, pp. 1-162.

Fielding, R. et al., "Hypertext Transfer Protocol—HTTP/1.1", *Internet Engineering Task Force (IETF)* Internet Draft, draft-ietf-http-v11-spec-00.txt Nov. 1995, pp. 1-81.

Malkin, G., "RIP Version 2 Carrying Additional Information", *Internet Engineering Task Force (IETF) Request for Comments (RFC) 1388* Jan. 1993, pp. 1-7.

Mockapetris, P., "Domain Names—Concepts and Facilities", *IETF RFC 1034* Nov. 1987, 55 pgs.

Mockapetris, P., "Domain Names—Implementation and Specification", *IETF RFC 1035* Nov. 1987, 55 pgs.

Moy, J., "OSPF Version 2", *Internet Engineering Task Force (IETF) Request for Comments (RFC) 1583* Mar. 1994, 132 pgs.

Parris, C. et al., "A Dynamic Connection Management Scheme for Guaranteed Performance Services in Packet-Switching Integrated Services Networks", UC Berkeley Computer Science Division Tech. Report TR-93-005 1993, 37 pgs.

Partridge, C. et al., "Host Anycasting Service", *Internet Engineering Task Force (IETF) Request for Comments (RFC) 1546* Nov. 1993, pp. 1-9.

Rekhter, Y. et al., "A Border Gateway Protocol 4 (BGP-4)", *Internet Engineering Task Force (IETF) Request for Comments (RFC) 1771* Mar. 1995, pp. 1-57.

Rekhter, Y. et al., "Application of the Border Gateway Protocol in the Internet", *Internet Engineering Task Force (IETF) Request for Comments (RFC) 1772* Mar. 1995, pp. 1-19.

Savage, S. et al., "Detour: Informed Internet Routing and Transport", *IEEE Micro* vol. 19, No. 1 Jan.-Feb. 1999, pp. 1-10.

Schemers, R., "Ibnamed: A Load Balancing Name Server in Perl", *1995 LISA IX* Monterey, California Sep. 1995, pp. 1-12.

Topolcic, C., "Experimental Internet Stream Protocol, Version 2 (ST-II)", *Internet Engineering Task Force (IETF) Request for Comments (RFC) 1190* Oct. 1990, pp. 1-148.

Touch, J. et al., "The X-Bone", *Third Global Internet Mini-Conference at Globecom '98* Sydney, Australia (pp. 44-52 of mini-conference) Nov. 1998, pp. 59-68.

Traina, P., "BGP-4 Protocol Analysis", *Internet Engineering Task Force (IETF) Request for Comments (RFC) 1774* Mar. 1995, pp. 1-10.

Traina, P., "Experience with the BGP-4 Protocol", *Internet Engienering Task Force (IETF) Request for Comments (RFC) 1773* Mar. 1995, pp. 1-9.

Wessels, D. et al., "Application of Internet Cache Protocol (ICP), Version 2", *Internet Engineering Task Force (IETF) Request for Comments (RFC) 2187* Sep. 1997, pp. 1-24.

Wessels, D. et al., "Internet Cache Protocol (ICP), version 2", *Internet Engineering Task Force (IETF) Request for Comments (RFC) 2186* Sep. 1997, pp. 1-9.

Extended European Search Report, mailed Sep. 24, 2013, Application No. 06717386.4 filed Jan. 3, 2006; 6 pgs.

Hagens et al., U.S. Appl. No. 14/321,731, filed Jul. 1, 2014, "Systems and Methods for Locating Endpoints in a Communication Network".

\* cited by examiner

SYSTEMS AND METHODS FOR THIRD PARTY EMERGENCY CALL TERMINATION

The present application is a continuation of U.S. patent application Ser. No. 11/009,212, filed Dec. 9, 2004, now U.S. Pat. No. 7,734,019, which is related to U.S. patent application Ser. No. 11/009,204 entitled "Systems and Methods for Dynamically Registering Endpoints in a Network," and filed by Terpstra; and U.S. patent application Ser. No. 11/009,216 entitled "Systems and Methods for Locating Endpoints in a Communication Network," and filed by Hagens et al. The aforementioned applications are assigned to an entity common hereto, and filed on a date common herewith. Further, the entirety of each of the aforementioned applications is incorporated herein by reference for all purposes.

BACKGROUND OF THE INVENTION

The present invention relates to systems and methods for identifying the location of a communication device, and in particular to systems and methods for identifying the location of a device originating a communication and/or providing location information to an emergency services dispatcher.

In traditional land based telephone systems, a call is passed to public safety answering point with a generally available call back number that is associated with a fixed physical location of the originating telephone. The call back number can be used to identify the location of an originating call, and the location information can then be passed public safety answering point. Unlike traditional land based systems, developing telecommunication networks often associate telephone numbers with telecommunication devices or registered users rather than physical locations. Thus, it is often the case that the associated telephone number is not directly correlated to a physical location of an originating call. This can be detrimental to servicing emergency calls. Further, with the ever increasing competition among telecommunication service providers, there is some concern that the call back information may be used for competitive or other marketing reasons. Thus, there is some resistance to sharing callback information between telecommunication service providers. This resistance to sharing call back numbers further inhibits the successful treatment of calls to a public safety answering point.

Hence, for at least the aforementioned reasons, there exists a need in the art for advanced systems and methods to address the needs of the communication industry.

BRIEF SUMMARY OF THE INVENTION

The present invention relates to systems and methods for identifying the location of a communication device, and in particular to systems and methods for identifying the location of a device originating a communication and/or providing location information to an emergency services dispatcher.

Various embodiments of the present invention provide methods for servicing an emergency call. The methods include providing a location database that maintains a physical location of a communication device. Further, an emergency call is received that originates from the communication device accessible via a call back number. A call request is formed in relation to the emergency call. The call request includes an indication of an emergency service answering system and a key. The call request is provided to a network that is capable of routing the emergency call to an emergency service answering system indicated by the call request. A request for the call back number and the physical location of the communication device are received, and in response to the request, the call back number and physical location of the communication device are provided.

In some instances of the methods, the emergency service answering system is a PSAP indicated by an ESRN. In such instances, the key is an ESQK that is operable to trigger a lookup of a call back number for the communication device and a location of the communication device. In particular instances, the lookup of the call back number is performed by an ALI database. Thus, the request for the call back number and the physical location of the communication device is received from the ALI database.

In yet other instances of the methods, a communication device stability module is provided, and the methods further include determining a location status of the communication device, and based at least in part on the location status of the communication device, querying for a location of the communication device. As just some examples, the location status can be an indication that the communication device has or may have moved. Thus, the location status may be triggered by a change in Internet Protocol address between when the device previously accessed the network, a recent power on or boot-up status provided by the communication device, an access to the network via a different gateway or other server than previously utilized, and/or an indication from the communication device that the device has moved.

In some cases, querying for the current location of the communication device includes connecting the communication device to a voice response unit capable of ascertaining the location of the communication device. In one particular case, the voice response unit asks for and receives the physical address of the communication device from a user of the communication device. In other cases, a plurality of potential locations for the communication device are predefined in relation to the communication device. When the communication device is connected to the voice response unit, a menu comprising the list of predefined locations is presented, and a user can select one of the predefined locations as the physical location of the communication device. Thus, a home address, a work address, a vacation home address, and/or another likely location of the communication device can be registered in relation to the communication device. This facilitates ease of updating a physical location of a mobile communication device.

In yet other cases, querying for the current location of the communication device includes sending a voice mail and/or an email to a user of the communication device indicating that the user should call in to the voice response unit; providing a modified dial tone to the communication device, wherein the modified dial tone indicates that the user should call in to the voice response unit; and/or sending a voice mail to a user of the communication device indicating that the user should call in to the voice response unit. Alternatively or in addition, querying for the current location of the communication device includes sending an email to a user of the communication device indicating that the user should access a website that is operable to query for updated location information; providing a modified dial tone to the communication device, wherein the modified dial tone indicates that the user should access the website; and/or sending a voice mail to a user of the communication device indicating that the user should access the website.

Other embodiments of the present invention provide methods for terminating an emergency call. The methods include receiving a call request from a third party network. The call request is associated with an emergency call placed by a communication device communicably coupled to the third party network, and the call request includes an indication of an emergency service answering system and a key in place of a call back number. The key is provided to the emergency service answering system, and a communication connection between the communication device and the emergency service answering system is initiated. In some cases, the key may be the same as the call back number when ALI is loaded with the telephone number. In such methods, the emergency service answering system is capable of using the key to determine the call back number for the communication device.

In some cases, the call back number and location of the communication device are available to the emergency service answering system, but concealed from the recipient of the call request by the third party network. In some instances, the emergency service answering system is a PSAP, and the call back number and/or location of the communication device are available to the PSAP indirectly via an ALI database. In some cases, the lookup includes accessing a location database maintained in relation to the third party network.

Yet other embodiments of the present invention provide systems for servicing an emergency call. The systems include a location database and a computer readable medium. The computer readable medium includes instructions executable by a microprocessor to: receive an emergency call that originates from a communication device and is at a physical location. The instructions are further executable to form a call request in relation to the emergency call that includes an indication of an emergency service answering system and a key; to provide the call request to a network that is capable of routing the emergency call to an emergency service answering system indicated by the call request; to receive a request for the physical location of the communication device; to access the location database where the physical location of the communication device is maintained; and in response to the request for the physical location of the communication device, to provide the physical location of the communication device. In some cases, the instructions are further executable to: receive a request for the call back; and in response to the request for the call back number, provide the call back number. The request for either or both of the call back number and the physical location of the communication device can be received either directly or indirectly from the emergency service answering system. Further, the call back number and/or physical location of the communication device can be concealed from the network. As one example, the aforementioned information can be indirectly requested via an ALI database.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1A:
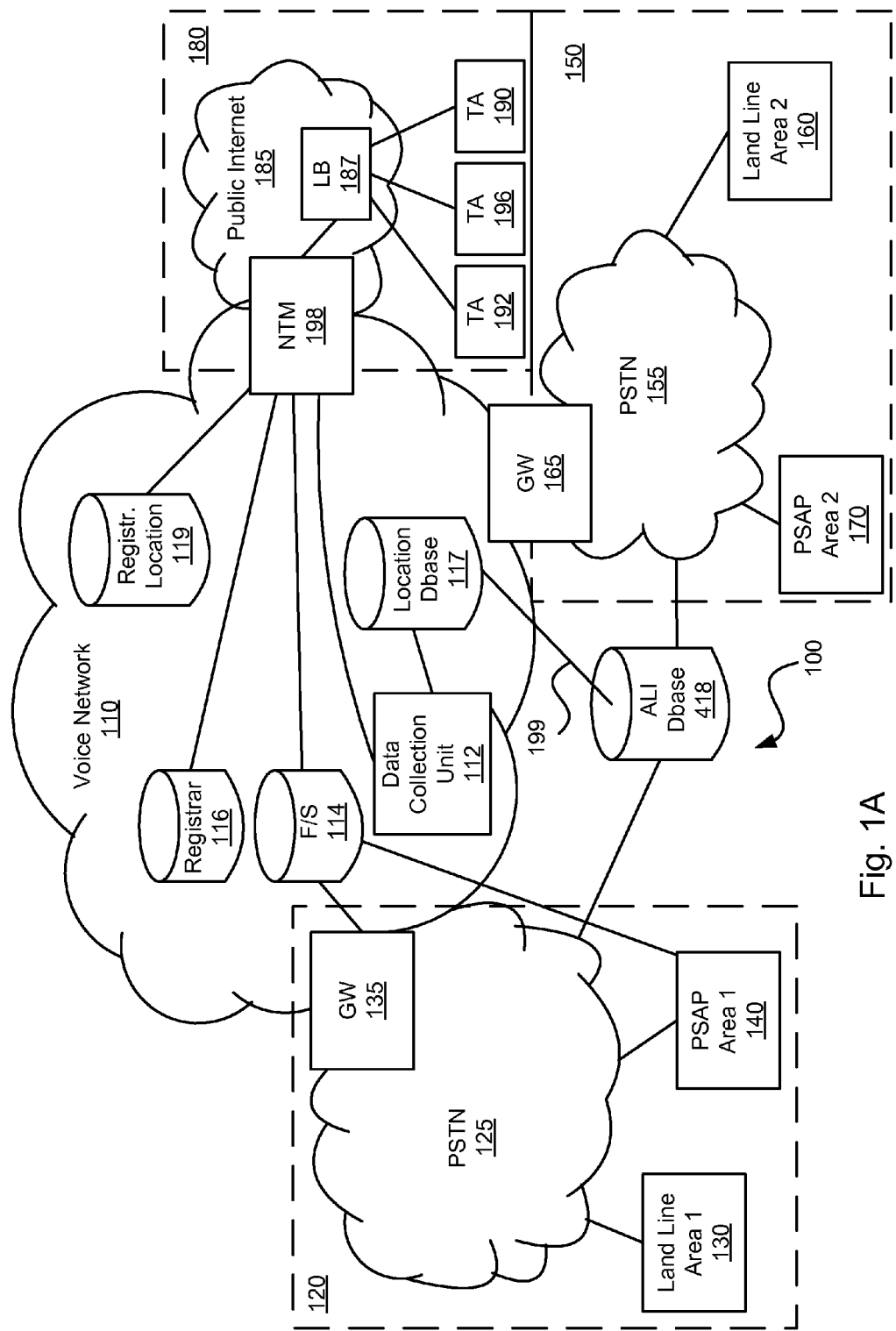
FIG. 1 depict a communication network in accordance with some embodiments of the present invention as well as a compound non-traditional communication device useful in accordance with some embodiments of the present invention.

The present invention relates to systems and methods for identifying the location of a communication device, and in particular to systems and methods for identifying the location of a device originating a communication and/or providing location information to an emergency services dispatcher.

Some embodiments of the present invention provide systems and methods for servicing emergency calls. One such method includes providing a location database that includes physical location information about a communication device. This location information can be accessed either directly or indirectly by an emergency service answering system, while concealing the information from a network responsible for terminating the call. In one particular embodiment of the present invention, a first network can receive an incoming call from a user associated with the network. In turn, the first network determines that the incoming call is an emergency call and obtains an indication of an emergency services answering system that services emergency calls originating from the geographic area where the user is located, and a key. The indication of an emergency services answering system and the key are passed to a second network responsible for terminating the call. The second network routes the call and provides the key to the emergency services answering system indicated. The emergency services answering system then uses the key to request the location of the user and the call back number of the user from the first network.

In some cases, one or more networks may not include capability to route calls to various emergency services answering systems. In such cases, systems and methods of the present invention may be utilized to allow a third party network to terminate calls going to unsupported emergency services answering systems. Further, in some cases this can be done without disclosing various information about the calling party to the network terminating the call, while still making such information available to the receiving emergency services answering systems. Based on the disclosure provided herein, one of ordinary skill in the art will recognize various other advantages that can be achieved using systems and methods of the present invention.

Various embodiments of the present invention provide methods for identifying communication origin location in relation to an emergency response system. As used herein, the term "communication origin location" is used in its broadest sense to mean any description of the physical location from which a communication is originated. Thus, for example, a communication origin location can be, but is not limited to, a street address of the location where a communication is being initiated, or a longitude and latitude coordinate of the location from which the communication originates.

The aforementioned methods for identifying communication origin location can include providing a communication device stability module capable of determining a location status of a communication device. As used herein, the term "stability module" is used in its broadest sense to mean any system, device, and/or software program capable of receiving inputs from or about a communication device, and determining whether the communication device may have potentially changed location. Further, as used herein, the term "location status" is used in its broadest sense to mean any status about a communication device related to the location of the communication device. Thus, for example, a location status can indicate, among other things, that a subject device has moved or has potentially moved, and/or the actual location of the subject device. As just some examples, a location status indicating that a subject device potentially moved may be triggered by a change in Internet Protocol address between when the device previously accessed the network, a recent power on or boot-up status provided by the communication device, an access to the network via a different gateway or load balancer than previously utilized, and/or an indication from the communication device that the device has moved. Yet further, the term "communication device" is used in its broadest sense to mean any device whereby communications or other information are introduced or received from a communication network. Thus, as just some examples, the communication device can be, but is not limited to, a SIP phone, a DSL modem, a dial up modem, or a cable modem. Based at least in part on the location status of the communication device, a query for a current location of the communication device is performed. In some places in this document a communication device is generally referred to a Terminal Adapter ("TA").

In some cases of the aforementioned methods for identifying communication origin location, querying for the current location of the communication device includes connecting the communication device to a voice response unit capable of ascertaining the physical location of the communication device. In one particular case, the query is performed via a voice response unit that requests and receives the physical address associated with the location of the communication device from a user of the communication device. In other cases, a plurality of potential locations for the communication device are predefined in relation to the communication device. When the communication device is connected to the voice response unit, a menu comprising the list of predefined locations is presented, and a user can select one of the predefined locations as the physical location of the communication device. Thus, a home address, a work address, a vacation home address, and/or another likely location of the communication device can be registered in relation to the communication device. This facilitates ease of updating a physical location of a mobile communication device.

Turning to FIG. 1A, a communication network 100 operable in accordance with various embodiments of the present invention is illustrated. Communication network 100 includes a voice network 110 with one or more registrar servers 116, one or more feature servers 114, one or more data collection units 112, and one or more location databases 117. Registrar server 116 is operable to direct communications. Feature server 114 is operable to provide one or more telecommunications services provided via voice network 110. For example, feature server 114 may provide caller identification, call forwarding, voice mail, and/or the like. In one particular case, feature server 114 is a Class-5 soft switch.

Data collection unit 112 is operable to gather information from or about one or more communication devices accessing voice network 110. Such information may include, for example, the physical location of a communication device and identification information about the communication device. This information can be updated to location database 117. Location database 117 may be used to provide physical location information to an Automatic Location Identification ("ALI") database 418 as known in the art. Such an ALI database is accessible to one or more Public Safety Answering Points ("PSAP"), and can provide physical location information about the location of an incoming call.

In addition, network 100 includes one or more NAT Traversal Managers ("NTM") 198 and one or more gateways 135, 165. In the illustrated configuration, NTM 198 is operable to facilitate communications between a public internet 185 and voice network 110. Similarly, gateways 135, 165 are operable to facilitate communications between respective Public Switched Telephone Networks (PSTN) 125, 155 and voice network 110. Such gateways can be, for example, gateways capable of transmissions between TDM and IP sources. NTMs and gateways are available from a number of sources, with a number of functional capabilities, and in a number of different configurations. Based on the disclosure provided herein, one of ordinary skill in the art will recognize one or more appropriate NTMs and/or gateways capable of supporting the disclosed functions. In some embodiments, NTM 198 is operable to traverse home firewalls by keeping a pinhole open for sending SIP Requests to an accessing communication device. This may be used to reduce or eliminate the possibility of a home firewall blocking SIP Requests related to establishing a call to the communication device. The communication device can also participate in keeping the pinhole open by periodically sending SIP Register messages to NTM 198.

While FIG. 1A shows two PSTNs 125, 155 included with network 100, one of ordinary skill in the art will recognize that any number of PSTNs and/or LECs can be communicably coupled to voice network 110. For illustration purposes, PSTNs are shown coupled to one or more land lines 130, 160 via which fixed point telecommunications can be serviced. Such land lines can be, for example, traditional PSTN phone lines coupled to traditional telephones. The PSTN receiving the call may access location database 117 (using a direct or other connection not necessarily traversing voice network 110). Location database 117 includes a cross reference providing the physical address associated with the fixed location land lines 130, 160. Using this physical information, a PSAP responsible for responding to emergency calls in the geographic area associated with the identified physical address is selected, and the PSTN connects the call to the selected PSAP. Based on this disclosure, it should be recognized that either of PSTNs 125, 155 may access one or more PSAPs not just the single PSAP illustrated. When the PSAP is contacted, the physical address information and other information about the call is automatically provided to the receiving PSAP.

Also shown are two PSAPs 140, 170 that are responsible for dispatching public services in relation to respective physical geographies 120, 150. A PSAP is a designated recipient of emergency calls within a particular geography. Typically, a PSAP includes an emergency operator and communication systems capable of dispatching appropriate emergency services to the physical origin of an emergency call, or some other location designated by an emergency caller. It should be recognized that any number of PSAPs can be communicably coupled with voice network 110 and/or respective PSTNs, with each representing different geographies. Also, as illustrated, some PSAPs (e.g., PSAP 140) may be directly coupled to voice network 110 (i.e., a VoIP enabled PSAP), while other PSAPs (e.g., PSAP 170) may only be accessible to voice network 110 via a PSTN (i.e., a PSTN exclusive PSAP). Yet other PSAPs (not illustrated) may only be accessible via voice network 110 (i.e., a VoIP exclusive PSAP). Such communication directly from voice network 110 to a PSAP may be handled by a Session Border Controller (SBC) which is capable of IP to IP transmissions.

In addition to land lines 130, 160, a number of non-traditional communication devices can be connected to network 100 from a number of physical locations. These devices are grouped together with public internet 185 as geographically unbounded region 180. Geographically unbounded region 180 can include a number of devices from physical geographies 120, 150, as well as other physical geographies. Such non-traditional communication devices can include, but are not limited to, one or more fixed location communication devices 190, 192 stationed in various physical locations, and/or one or more roaming communication devices 196 capable of moving between various physical locations. Such communication devices can be, but are not limited to, traditional analog telephones communicably coupled to public internet 185 via an Analog Terminal Adapter (ATA), Voice Over Internet Protocol (VoIP) phones, computers operable to transmit via public internet 185, Personal Digital Assistants (PDA) operable to transmit via public internet 185, and/or the like. As illustrated, public internet 185 includes a load balancer 187 operable to redirect a communication device to an appropriate access point. Based on the disclosure provided herein, one of ordinary skill in the art will recognize one or more routing rules that can be employed in relation to the redirection. As illustrated, PSAP 170 is accessible to voice network 110 only via PSTN 155, while PSAP 140 is accessible to voice network 110 via both PSTN 125 and directly as indicated by a path 199.

Figure 1B:
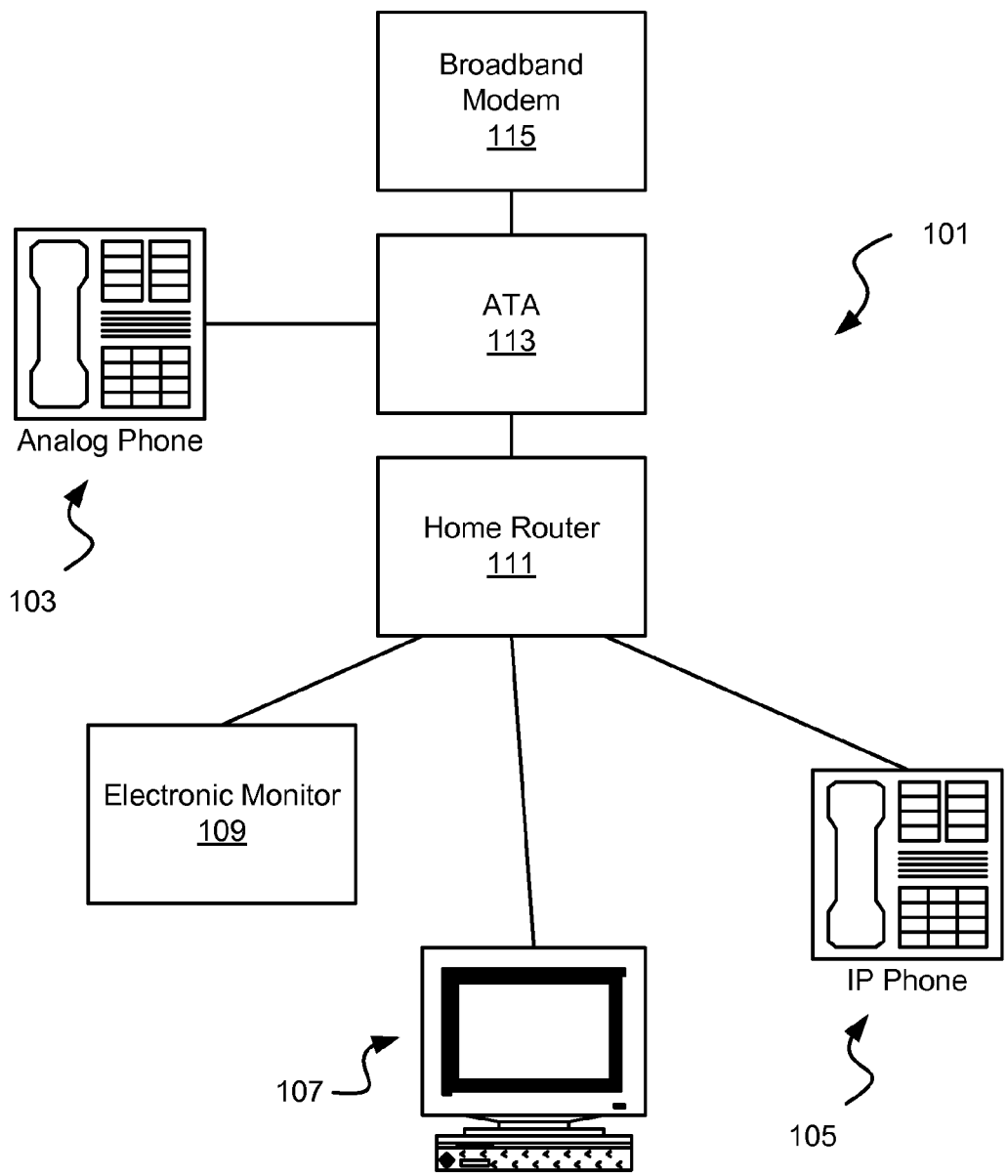

Turning to FIG. 1B, an exemplary configuration of a compound, non-traditional communication device 101 useful in relation to embodiments of the present invention is illustrated. Non-traditional communication device 101 includes a broadband modem 115 capable of coupling to public internet 185, an Analog Terminal Adapter (ATA) 113 capable of attaching a traditional analog telephone 103 to broadband modem 115, and a home router 111 capable of allowing access for one or more communication devices to broadband modem 115. Such communication devices can be, for example, an electronic monitor 109, a personal computer 107, and an IP telephone 105. Electronic monitor 109 may be any device or system capable of monitoring a defined set of events and reporting on that set of events. Thus, for example, electronic monitor 109 can be a home security system or a patient health status monitoring system. Such systems may be capable of automatically initiating an emergency call and thereafter transmitting relevant information associated with the emergency call. Based on the disclosure provided herein, one of ordinary skill in the art will recognize a number of electronic monitoring equipment that can be associated with non-traditional communication device 101, and a number of situations that can be monitored by such devices.

It should be noted that the configuration is merely exemplary and that many configurations can be used in relation to embodiments of the present invention. For example, PC 107 may connect directly to broadband router 115, and in some cases, broadband router 115 may be replaced by a dial up modem. Alternatively, IP phone 105 may include a broadband modem capable of coupling directly to public internet 185. Based on the disclosure provided herein, one of ordinary skill in the art will recognize a number of other configurations and/or equipment either apart or in combination that can serve the function of non-traditional communication device 101.

Figure 2A:
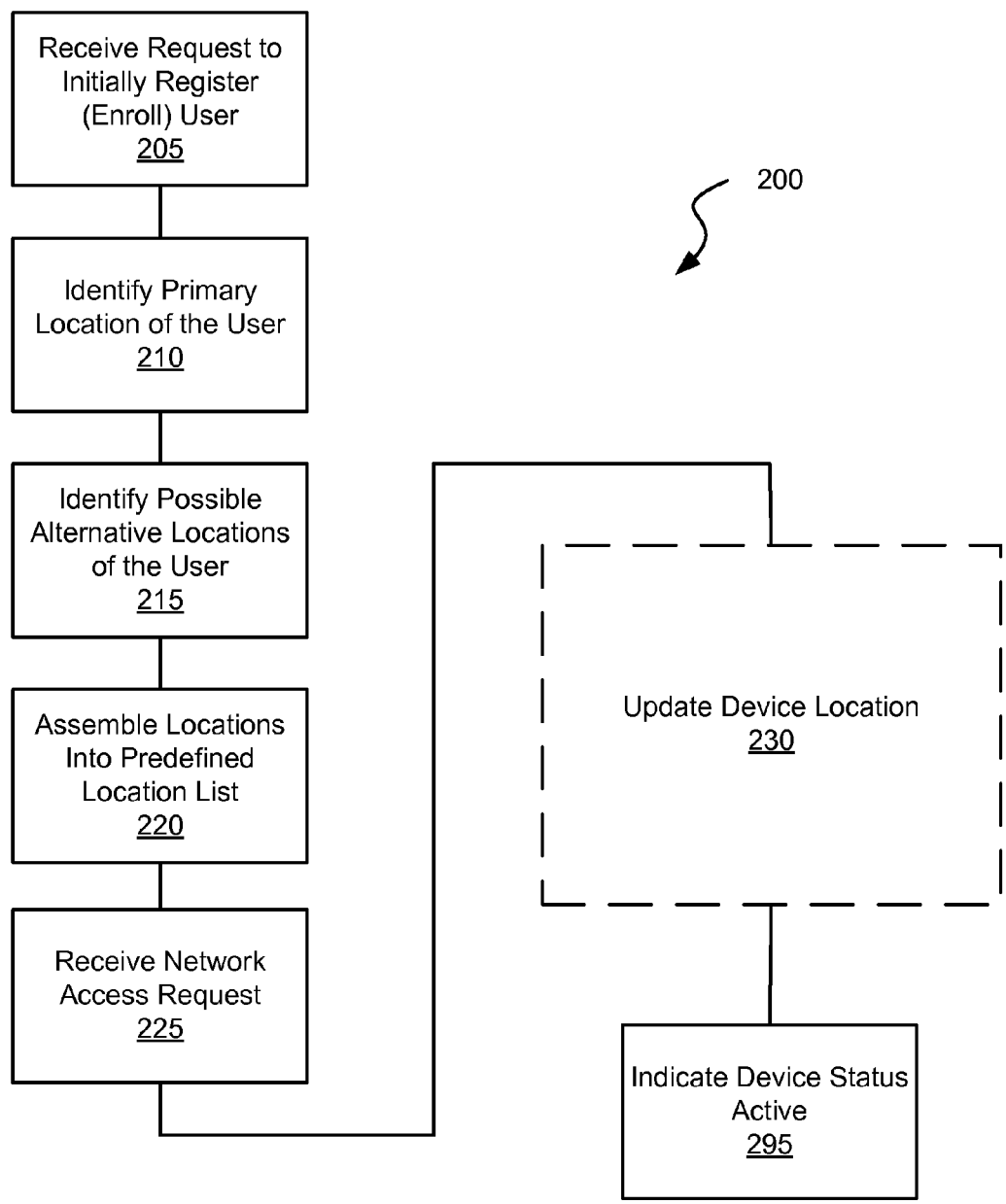
FIG. 2A depicts a method for registering devices and/or device locations in accordance with various embodiments of the present invention.

Turning now to FIG. 2A, a flow diagram 200 illustrates a method for identifying communication device location in accordance with one or more embodiments of the present invention. Following flow diagram 200, a request is received to initially register or enroll a user (block 205). This user may be, for example, an individual or entity that contacts a telecommunications provider for service. The user is registered by receiving and entering, for example, the name and contact information for the user. The contact information for the user may include, but is not limited to, the user's home address, billing address, payment form, email address, telephone number, and/or the like. Further, the telecommunications provider typically assigns one or more telephone numbers through which communication devices associated with the user can be accessed.

In some embodiments of the present invention, this process of registration is facilitated using an Internet website. In such an embodiment a potential customer accesses a website maintained by a telecommunications service provider. At the website, the potential customer enters contact and payment information. The telecommunications services provider provides the customer with a telephone number that is provisioned to direct communications to a communication device used by the customer. Alternatively or in addition, the telecommunications services provider or user may port the user's existing number to the provider (LNP).

In addition, a primary location of the user is identified (block 210), along with one or more alternative locations for the user (block 215). In general, the primary location would be where the user would most likely be found, and the alternative locations would be locations that the user frequents. Thus, as one example, the user may be an individual with the individual's home address being the primary location. The home address can be maintained in a format that can be used by a PSAP in disbursing emergency services personnel. Thus, for example, the primary location may be a street address of the individual's home. Based on the disclosure provided herein, one of ordinary skill in the art will recognize various other location formats that may be used in accordance with embodiments of the present invention. For example, the locations may be recorded in longitude and latitude coordinates satisfactory for access using a GPS guidance system. Alternative locations may be the individual's work address, the address of a friend or relative's house, the address of a frequented hotel, and/or the like. In one particular embodiment, the list of locations is entered by a user via a website maintained by the telecommunications service provider.

All of these locations are assembled into a predefined location list (block 220) which is associated with the user. In some embodiments of the present invention, this location list is associated with each phone number assigned to the user. Further, this list can be dynamic allowing the user to add, delete, and change locations from the predefined location list when such changes are appropriate. In some cases, changes can be made to the list of locations by indicating a new current physical location via a voice response unit as described below. Further, where a particular location is not used for a long period of time, it may be removed from the list. In other cases, the list may be modified through access to the website maintained by the telecommunications service provider.

In some embodiments, this predefined location list is associated with a device used by the user. Thus, for example, when the user registers with the system, one or more communication devices utilized by the user are associated with the predefined location list. This may include, for example, associating a serial number or some other identifying feature of a device with the predefined location list.

Periodically, a communication device accesses the network and registers/re-registers itself with the telecommunications service provider (block 225). The registration access may be done automatically based upon a preset period, and/or upon trying to make a phone call using the network. During the registration process, various information is provided to the telecommunications service provider including, but not limited to, the call back number for the originating communication device and origination information related to the call. In some cases, the origination information includes an IP address associated with the communication device originating the call.

Figure 2B:
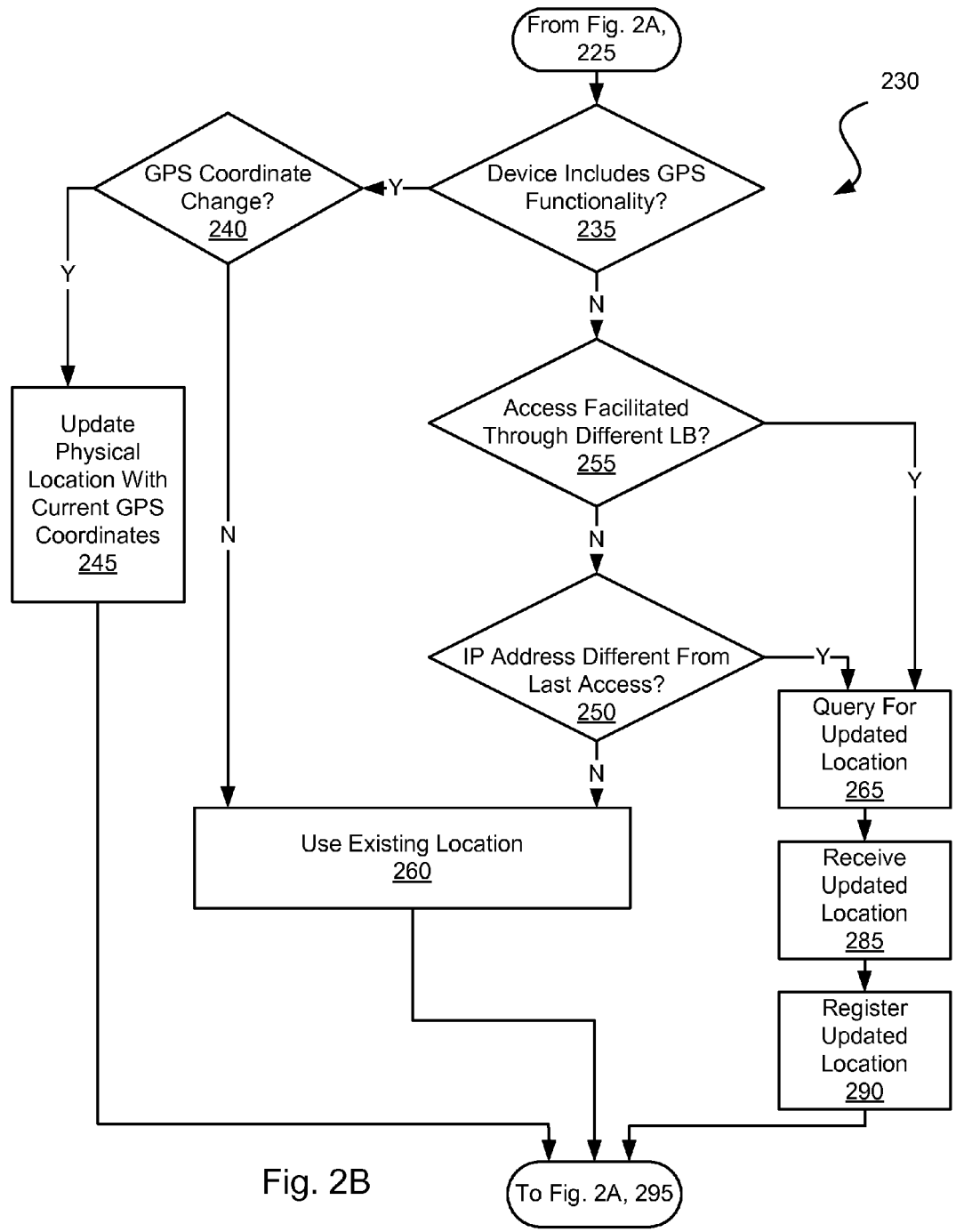
FIG. 2B depicts a method for updating device location in accordance with some embodiments of the present invention.

Upon receiving the network access request (block 225), it is determined whether the communication device making the request may have moved, and where appropriate updating the location of the communication device (block 230). One or more methods may be used to determine a change in device location including, but not limited to, a user of the device indicating that the device location has changed, a change in an IP address of the communication device, access to a different load balancer by the communication device, and/or an automatic locating mechanism such as, for example, GPS capability associated with the communication device. Turning to FIG. 2B, one embodiment of block 230 is described in greater detail.

It is determined whether the communication device registering with the network is associated with an automatic locating mechanism, and in particular whether it includes GPS locating capability (block 235). Where such capability is available (block 235), it is determined whether the current GPS coordinates have changed significantly since the last time the communication device was used to access the network (block 240). In one particular case, this can include maintaining a register that includes the previous location of the communication device, while in other cases this can include accessing location database 117 to determine the previous location of the communication device. This previous location information can be compared with the present information to determine whether the communication device has changed locations (e.g., whether a substantial change in GPS latitude and/or longitude is noted).

Where the GPS coordinates indicate a substantial change in location (block 240), the new coordinates are updated to be the current physical location of the communication device (block 245). In some cases, this can include providing the newly received coordinates to data collection unit 112 which in turn updates the location information to location database 117. Before the update to the location database, the GPS coordinates may be converted to address information useful in dispatching emergency personnel. This may include converting the GPS coordinate information to street address information. As another example, updating location database 117 with the most recent GPS location may be done directly without utilizing the data collection unit. Where no substantial change in location is indicated by the GPS coordinates (block 240), the existing location information for the communication device is used (block 260).

Figure 3A:
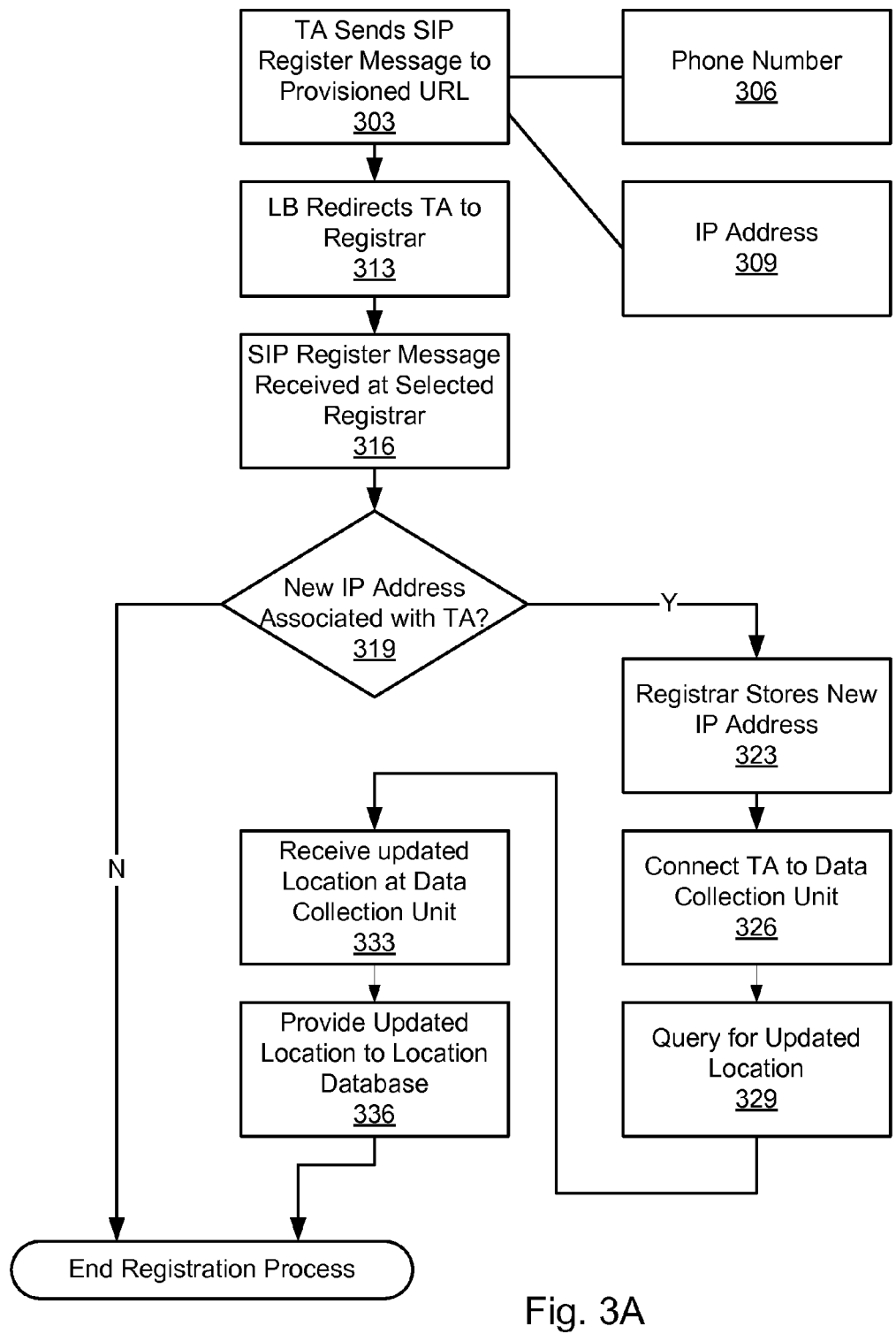
FIG. 3 depict a method in accordance with one or more embodiments of the present invention for locating a device and/or fielding communications.

Alternatively, where it is found that the communication device is not associated with an automatic locating mechanism (block 235), it is determined if the communication device is accessing the network using the same load balancer used in a prior access (block 255). More particularly, when a device accesses a load balancer, the load balancer queries the load balancer cache to determine registration status or other preferences about the communication device. Where such preferences are found, it is assumed that the communication device accessed the current load balancer last time the communication device accessed the network. Alternatively, where such preferences are not found, the load balancer creates a device record in its cache and it is assumed that a different load balancer was used last time the communication device accessed the network. Access via a different load balancer suggests that the communication device may have moved.

Where it is determined that the communication device may have moved (block 255), the user utilizing the communication device is queried for updated location information (block 265). In some cases, this can include connecting the communication device to data collection unit 112 which performs the query. Location information is received from the user (block 285), and the location information is recorded in a location database in association with a designation of the communication device (block 290). The designation of the communication device can be, for example, a telephone number of the communication device. This updated location information can be accessed indirectly by a call to an ALI database as described in more detail below in relation to FIG. 3.

As one particular example, data collection unit 112 is a Voice Response Unit (VRU) that presents a selection menu with the primary location and one or more alternative locations. This menu can be audibly provided to the user via the communication device, and the user can select one of the provided locations or select "other" and provide a new location not previously included in the list of locations. Thus, for example, where the list of locations includes the user's home address and work address and the user is at the home address, the user would select the home address. Alternatively, where the user is at a friend's house, the user would select "other" and verbally say the address of the friend's house. This new location would be added to the list of locations. Based on the disclosure provided herein, one of ordinary skill in the art will recognize that the list of locations may be presented in an order where the most likely address is presented first followed by less likely addresses in descending order. Further, based on the disclosure provided herein, one of ordinary skill in the art will recognize that some of the locations can be removed from the list based on non-use. It should also be noted that other mechanisms for querying the user for location information can be used in accordance with embodiments of the present invention. For example, the communication device may have a display and data collection unit 112 may be capable of displaying a list of location options via the display. In such a case, the user can select from the displayed locations, or enter an alternative location.

Where the communication device accesses the network via the same load balancer, but using an IP address different from that previously used to access the network (block 250), potential movement of the communication device is indicated. In particular, such a change in IP address may indicate that the communication device was powered down between network accesses, and such a power down state suggests that the communication device was potentially moved. Based on this indication of potential device movement, the user is queried for location information and that location information is updated as pervasively described in relation to blocks 265, 285 and 290. Where no potential device movement is indicated (blocks 250, 255), the existing location information is used (block 260). Returning to FIG. 2A, with the updating of device location complete (block 230), the status of the device is indicated as active allowing the network to service calls from the device (block 295). In some cases where an emergency call is placed, but the device location update (block 230) fails to complete, the call is still serviced by the network.

In other embodiments, the predefined location list is not initially populated, but is rather dynamically formed by entering a new location in the list each time the user accesses the telecommunications network from a potentially different location. Over time, the list of locations becomes larger as the user utilizes the telecommunications network from different locations.

Turning to FIG. 3, a flow diagram 300 depicts a more particular embodiment of the present invention for facilitating emergency calls. Following flow diagram 300, a SIP endpoint represented by one of communication devices 190, 192, 196 sends a SIP Register Message to a provisioned URL (block 303). The SIP Register Message includes the telephone number (block 306) for the communication device, as well as the IP address (block 309) of the communication device.

The SIP register message goes to load balancer 187, and load balancer 187 redirects the originating communication device based on one or more routing rules to registrar 116. This redirection can include a SIP Moved Temporarily Message with one or more redirect URLs. The communication device uses the first of the redirect URLs as the destination of the original SIP Register Message for a period specified in the Moved Temporarily Message. The first URL indicates NTM 198 and based on the IP address of the communication device and the port on which NTM 198 received the request, NTM 198 directs the SIP Register Message to registrar server 116 (block 316). When registrar server 116 receives the SIP Register Message, it may authenticate the communication device by sending back a SIP Authorize Response. Such a response notifies the communication device that it needs to send a subsequent SIP Register Message with a valid username and password. Registrar server 116 then accesses subscriber information with the username and password to validate the registration.

During this process, registrar server 116 determines if the IP address of the communication device is the same as that used last time the communication device accessed the network (block 319). Where a different IP address is detected (block 319), registrar 116 stores the newly received IP address as the current IP address (block 323) and sets up a call between the communication device and data collection unit 112 (block 326). Where data collection unit 112 is a voice response unit, registrar 116 uses SIP signaling to invite the VRU to join a call. Because registrar server 116 does not yet have a Session Description Protocol (SDP) for the communication device, it sends a null SDP to the VRU placing it on hold. When registrar server 116 receives the SDP from the VRU, registrar server 116 sends a SIP Invite to the communication device with the SDP for the VRU. The communication device returns its SDP to registrar server 116. This return from the communication device may occur during ringing so registrar server 116 can re-Invite the VRU before the call is answered. In addition, registrar server 116 uses the SDP from the communication device to send a SIP re-Invite to the VRU. When the VRU receives the SIP Invite, it takes the phone off hold, and waits for call answer. When the call answer occurs, the VRU begins playing menu options querying a user of the communication device for location information (block 329).

With the media path thus established between the communication device and the VRU, the user can hear the menu options via the communication device. The user can respond to the menu options by indicating a current location of the communication device which is received by the VRU (block 333). Further, in some cases, the VRU can perform some level of authentication to determine whether the accessing user is authenticated. In turn, the VRU updates location database 117 and associates the received location information with the telephone number of the communication device (block 336). In one particular case, updating location database 117 is done via a message sent in XML format from the VRU to location database 117. This completes the registration process which is periodically repeated, or performed on power up of the TA.

Based on the disclosure provided herein, one of ordinary skill in the art will recognize other possible methods for initiating communication between the VRU and the user. For example, the call may be automatically set up as previously described, or the user may be encouraged to call the VRU. The user can be encouraged to call the VRU in one of various ways including sending the user a voicemail, email or other message indicating that the user should call the VRU, changing the dial tone of the communication device used by the user, and/or the like. The dial tone could be changed from a standard dial tone to, for example, a stutter tone or other audible indicator played to the phone when the user picks up the receiver after changing IP addresses. This could indicate that the user needs to dial into the VRU and provide updated location information. As yet another alternative, a user may be directed to a website to update their location information. In particular, a user may be sent a voicemail, email, or a modified dial tone encouraging the user to log onto a particular website and update location information. In turn, the website receiving the updated location information may provide that location information to location database 117.

Figure 3B:
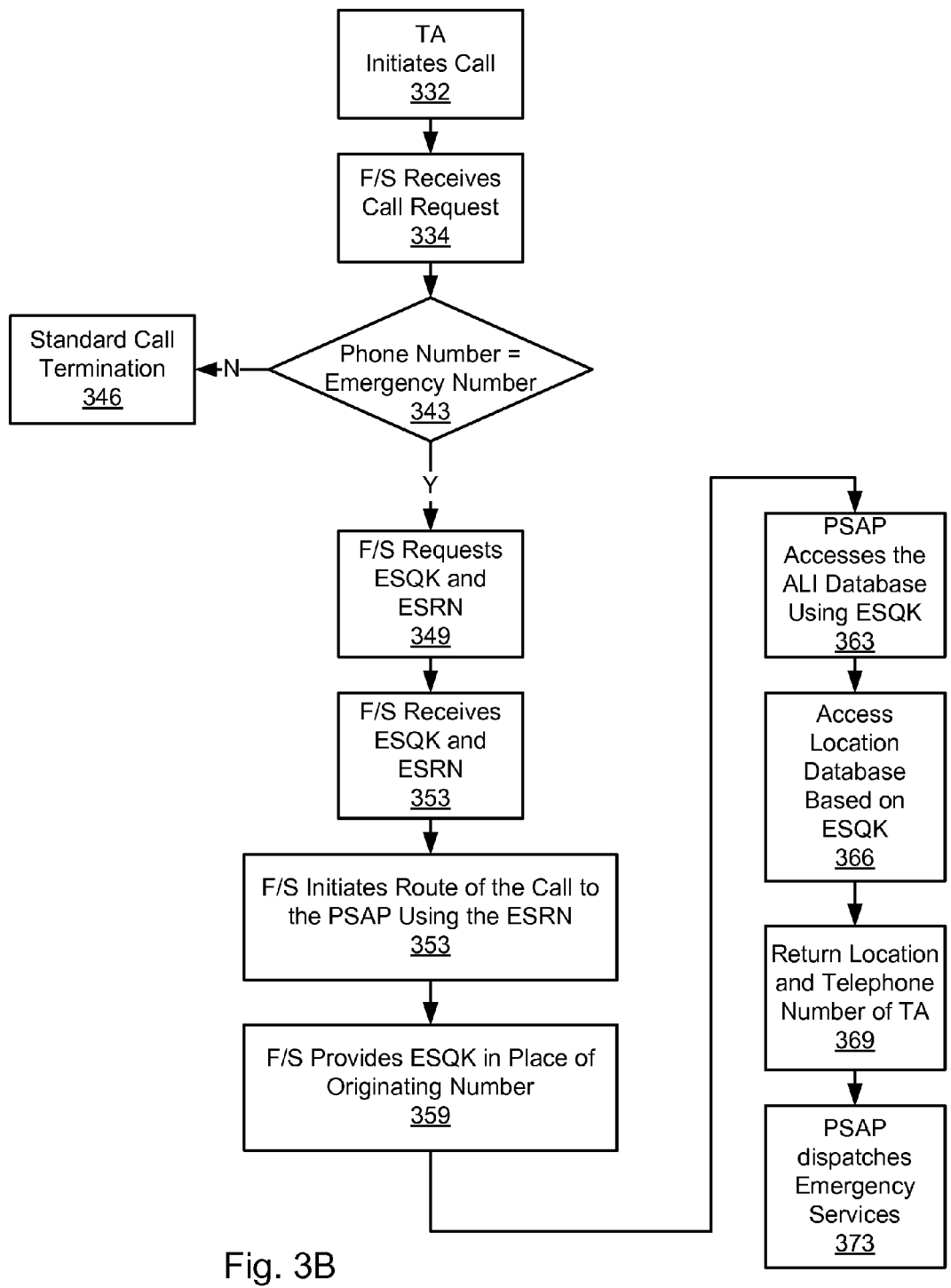

Turning to FIG. 3B, a flow diagram 301 depicts call completion processes that can be performed in accordance with one or more embodiments of the present invention. Following flow diagram 301, a TA initiates a call (block 332). The call includes the telephone number of the originating TA and the telephone number of the destination. It is determined if the call is an emergency call (block 343). In one particular case, this determination is made by determining whether the telephone number of the destination is "911". Where the call is a non-emergency call (block 343), standard call termination is utilized to complete the call (block 346).

Otherwise, where the call is an emergency call (block 343), feature server 114 requests contact information for the PSAP responsible for servicing emergency calls from the geographic area where the TA is located (block 349). The requested information includes an Emergency Services Routing Number ("ESRN") that uniquely identifies the appropriate PSAP, and an Emergency Services Request Key ("ESQK") that alerts the PSAP that an indirect lookup is necessary to determine the location and call back number for the communication device. The feature server receives the requested ESRN and ESQK (block 353), and initiates routing of the emergency call to the PSAP using the ESRN (block 353). Routing the emergency call to the PSAP includes setting up a media communication path from voice network 110 to the PSAP (e.g., PSAP 140) via a gateway (e.g., gateway 135) and a PSTN (e.g., PSTN 125) local to the PSAP. In other embodiments, voice network 110 enjoys a more direct link to the PSTN allowing voice network 110 to transmit information to the PSAP without traversing the PSTN. This possibility is depicted in FIG. 1A, where a direct connection 199 from voice network 110 to PSAP 140 is shown. In yet other embodiments where a Selective Router Trunk (SR Trunk) is available, voice network 100 routes the call to the SR Trunk, and if that fails to the PSAP admin line using the caller's phone number.

In the routed call, the telephone number for the TA is replaced by the ESQK (block 359). The PSAP receives the routed call and uses the ESQK to access ALI database 118 (block 363). Based on the received ESQK, ALI database 418 accesses location database 117 (block 366) which returns the location and telephone number for the TA (block 369). The PSAP can use the location information to dispatch emergency services, and the telephone number of the TA to call back where the call is lost (block 373).

Based on the disclosure provided herein, one of ordinary skill in the art will recognize that the ESQK is a specialized token used for one particular implementation, and that other tokens or substitute numbers may be used in accordance with other embodiments of the present invention. For example, voice network 110 may be capable of generating its own numbers for passage to a PSTN and operation similar to that previously described as an ESQK. These numbers would cause the PSTN to access a database in voice network 110 to find out call back and location information. Similarly, based on the disclosure provided herein, one of ordinary skill in the art will recognize that other routing indicators besides the ESRN may be available for use in directing an emergency call to the appropriate PSAP.

In some embodiments of the present invention, more than one telephone number is associated with a user and/or communication device. In some cases, these telephone numbers could each be associated with a physical location and when a user picks a particular telephone number, they are also picking the physical location associated with that telephone number. When the user selects to use one of the telephone numbers, they may also be able to select to forward calls received on all the other telephone numbers to the selected telephone number. In the case where the registrar server knows the other telephone numbers, the registrar server can set up the call forwarding. It could also be possible for the voice network to translate the original called number to the currently registered number on the feature server or Edge Proxy Server (EPS) fronting the feature server.

An ALI database can be updated to include all of the telephone numbers along with the associated physical locations, thus allowing a PSAP to use the received telephone number to access the ALI database and determine a physical location of the call origination. Where the telephone number is not local to the appropriate PSAP for the physical location, the voice network may still connect the emergency call using the admin line of the PSAP, and directing the PSAP to the ALI database for physical location information as previously described. However, where the originating telephone number is local to the PSAP, the call may be patched directly to the PSAP, and the PSAP can access the physical location information from the ALI database much as it would do if a traditional land line was used to make the emergency call.

In yet another embodiment of the present invention, the communication device used to access the voice network is communicably coupled to the voice network via a broadband interface such as, but not limited to, a DSL or Cable Modem connection. In the embodiment, the geographic location is associated with the particular broadband interface. Thus, when an emergency call is received from the communication device, the geographic location of the broadband interface can be used as the location of the communication device. In some cases, the location of the broadband interface is maintained in a central database of an ISP. Thus, to access the location information the voice network relies on access to data from the ISP. Where such data is available, call processing progresses similar to that described in relation to FIG. 2, except that instead of collecting data via the VRU, the data is gathered automatically from an available database. Registrar server 116 can use this location information to update the location database as previously described.

Figure 4:
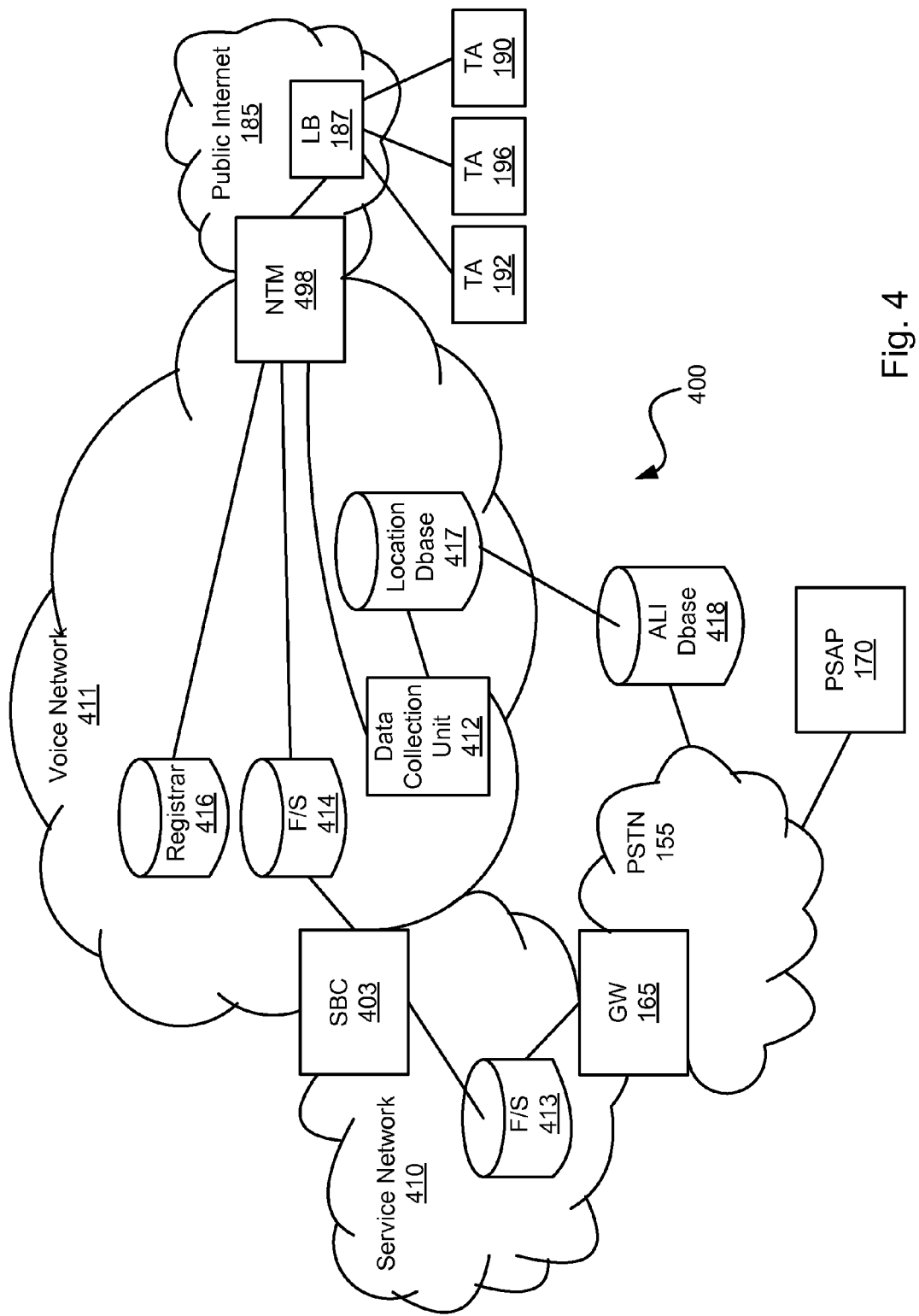
FIG. 4 depicts a system in accordance with various embodiments of the present invention for terminating third party emergency calls.

Turning to FIG. 4, a system 400 for terminating third party emergency calls in accordance with some embodiments of the present invention is illustrated. System 400 includes a voice network 411 with one or more registrar servers 416, one or more feature servers 414, one or more data collection units 412, and one or more location databases 417. Registrar server 416, feature server 414, data collection unit 412, and location database 417 are similar to the commonly named components described in relation to FIG. 1A above. Voice network 411 is communicably coupled to public internet 185 via NTM 498. Public internet 185 is communicably coupled to one or more communication devices 190, 192, 196 via load balancer 187 as described in more detail above in relation to FIG. 1A. It should be noted that voice network 411 need not offer the same services as that of service network 410. Thus, for example, service network 410 can be a VoIP network while voice network 411 may be a circuit switched network. Based on the disclosure provided herein, one of ordinary skill in the art will recognize a variety of networks and network types that can be used for both voice network 411 and service network 410.

System 400 also includes an ALI database 418 and a service network 410 communicably coupled voice network 411 via a session border controller 403. Service network 410 includes one or more feature servers 413 operable to receive communication information and instructions, and to terminate the communication information in accordance with the instructions. Service network 410 is communicably coupled to PSTN 155 via gateway 165. PSAP 170 is accessible via PSTN 155 as described in more detail above in relation to FIG. 1A.

Using system 400, the location and call back number for each of communication devices 190, 192, 196 is registered with voice network 411 and the information is maintained in location database 417. When an emergency call is made from one of communication devices 190, 192, 196, the call is ultimately directed to feature server 414. Feature server 414 requests an ESRN and ESQK in relation to servicing the call. This ESRN and ESQK, along with control of the emergency call are then passed to feature server 413. In turn, feature server 413 directs the call to the PSAP (e.g. PSAP 170) indicated by the ESRN and including the ESQK as the call back number for the originating communication device. PSTN 155 uses the received ESQK to access ALI database 418 to request the location of the originating communication device. Based on the received ESQK, ALI database 418 accesses location database 417 to access the location and call back number for the originating communication device. ALI database passes the location and callback information of the originating communication device to PSTN 155, and PSTN 155 fields the call and where necessary dispatches appropriate emergency services. Based on the disclosure provided herein, one of ordinary skill in the art will appreciate a variety of ESRN and ESQK like elements that can be used to implement systems and methods in accordance with embodiments of the present invention. For example, in some cases an ESQK may not be used at all if the third party voice network registers all telephone numbers with the ALI. Further, it should be noted that how the third party voice network derives the ESRN may be done in a variety of different ways.

Using such an approach, service network 410 can terminate emergency calls to the appropriate PSTN without knowing the underlying information about a user of the originating communication device. Thus, voice network 411 can provide emergency telephone service to its customers without implementing capability to terminate the calls, and without having to disclose information about its customer base to outsiders. This can provide an effective way for offering emergency telephone services for a VoIP service provider. Based on the disclosure provided herein, one of ordinary skill in the art will recognize that the systems and methods of the present invention are not limited to just VoIP networks, but rather the invention can be applied to wireless carriers and landlines (e.g., CLEC) as well.

Figure 5:
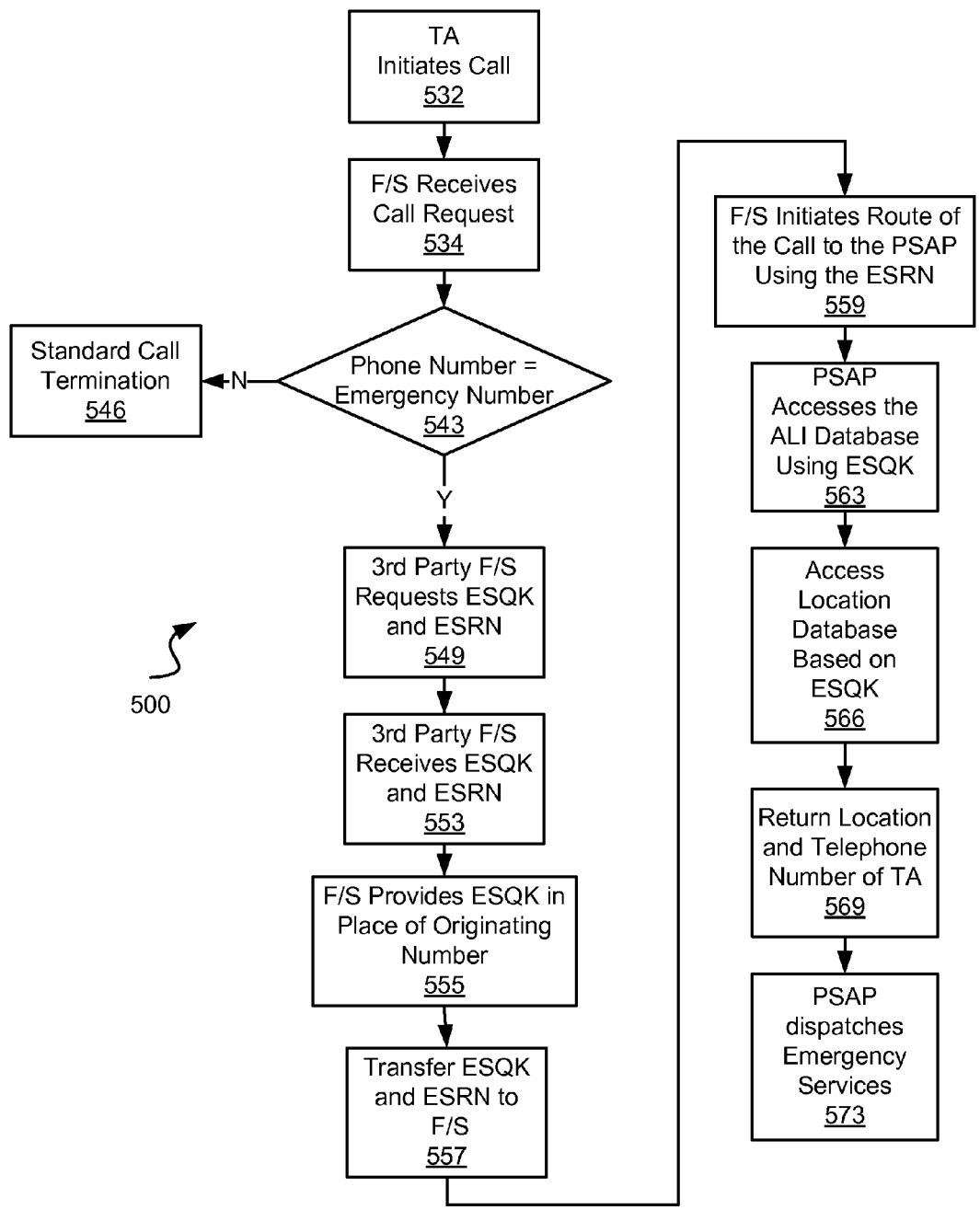
FIG. 5 is a flow diagram illustrating a method in accordance with some embodiments of the present invention for terminating third party emergency calls.

Turning now to FIG. 5, a flow diagram 500 illustrates a method in accordance with some embodiments of the present invention for terminating third party emergency calls. Following flow diagram 500, a communication device previously registered with voice network 411 initiates a call (block 532). This registration process includes determining a location of the communication device, and updating that location along with the callback number for the communication device with location database 417. In some cases, this registration process proceeds similar to that described above in relation to FIG. 3A. The call initiated by the communication device includes the telephone number of the originating TA and the telephone number of the destination. The call is received by feature server 414 (block 534), and the destination telephone number is used to determine if the call is an emergency call (block 543). Where the call is a non-emergency call (block 543), voice network 411 uses standard call termination to complete the call (block 546).

Alternatively, where the call is an emergency call (block 543), feature server 414 requests contact information for the PSAP responsible for servicing emergency calls from the geographic area where the TA is located (block 549). The requested information includes the ESRN for the appropriate PSAP, and an ESQK to be used in relation with the PSAP. Feature server 414 receives the requested ESRN and ESQK (block 553), and replaces the call back number of the originating communication device with the ESQK (block 555). With this done, feature server 414 transfers control of the emergency call to feature server 413 (block 557). In transferring the call, feature server 414 indicates that the call should be directed to the PSAP indicated by the ESRN. Further, by replacing the callback number with the ESQK, feature server provides a means for obtaining location information and the callback number for the originating communication device without disclosing information (e.g., the call back number) of the user originating the call. In this way, voice network 411 can guard its customer information from service network 410.

Having received control of the call and the ESQK and ESRN, feature server 414 initiates routing of the call to the PSAP indicated by the ESRN (block 559). The PSAP receiving the call accesses ALI database 418 using the received ESQK (block 563). Based on the received ESQK, ALI database 418 accesses location database 417 (block 566) which returns the location and telephone number for the originating communication device (block 569). The PSAP can use the location information to dispatch emergency services, and the telephone number of the TA to call back where the call is lost (block 573).

In conclusion, the present invention provides novel systems, methods and arrangements for detecting device locations; querying for device location, reporting device location, and/or servicing third party emergency calls. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for updating a physical location record in a database in connection with servicing a telecommunications call over at least a voice over Internet protocol (VoIP) network, the method comprising:
   receiving a telecommunications call originating from a communication device;
   determining whether the communication device is associated with an automatic locating device;
   if the communication device is associated with an automatic locating device, then querying for a current set of physical location coordinates generated by the automatic locating device;
   receiving the current set of physical location coordinates, wherein the physical location coordinates are imbedded in the session initiation protocol (SIP) message;
   comparing the current set of physical location coordinates to a set of physical location coordinates contained in the physical location record; and
   if the current set of physical location coordinates are different from contained set of physical location coordinates, updating the physical location record to include the current set of physical location coordinates.

2. A method as recited in claim 1, wherein the updating act comprises:
   replacing the contained set of physical location coordinates with the current set of physical location coordinates.

3. A method as recited in claim 1, wherein the automatic locating device is a Global Positioning System ("GPS").

4. A method as recited in claim 1, wherein the updating act comprises:
   converting the current set of physical location coordinates to address information useful in dispatching emergency personnel.

5. A method for servicing transitory telecommunication calls over at least a voice over Internet protocol (VoIP) network, the method comprising:
   providing a database having at least one physical location record;
   receiving a telecommunications call originating from a communication device, wherein the communication device is associated with an automatic locating device;
   receiving a current set of physical location coordinates generated by the automatic locating device, wherein the physical location coordinates are imbedded in the session initiation protocol (SIP) message;
   comparing the current set of physical location coordinates to a prior set of physical location coordinates contained in the physical location record;
   if current set of physical location coordinates are different from the prior set of physical location coordinates, updating physical location record to include the current set of physical location coordinates; and
   transmitting the current set of physical location coordinates to a third party for use in providing dispatch services.

6. A method as recited in claim 5, wherein the automatic locating device is a Global Positioning System ("GPS").

7. A method as recited in claim 5, wherein the updating act comprises:
   converting the current set of physical location coordinates to address information useful in dispatching emergency personnel.

8. A method as recited in claim 5, wherein the updating act comprises:
    replacing the prior set of physical location coordinates with the current set of physical location coordinates.

9. A method for updating a physical location record in a database in connection with servicing a telecommunications call over at least a voice over Internet protocol (VoIP) network, the method comprising:
    receiving a telecommunications call originating from a communication device;
    if the communication device is associated with an automatic locating device:
    receiving a current set of physical location coordinates generated by the automatic locating device, wherein the physical location coordinates are imbedded in the session initiation protocol (SIP) message;
    comparing the current set of physical location coordinates to a set of physical location coordinates contained in the physical location record; and if current set of physical location coordinates are different from contained set of physical location coordinates, updating physical location record to include the current set of physical location coordinates;
    if the communication device is not associated with an automatic locating device:
    receiving an Internet Protocol (IP) address associated with a device involved in servicing the telecommunications call;
    comparing the received IP address to a prior IP address associated with prior telecommunications call involving the communication device;
    if the received IP address does not match the prior IP address, then querying the communication device for a current physical location information;
    receiving the current physical location information; and
    registering the current physical location information in association with the communication device in the physical location record.

10. A method as recited in claim 9, wherein if the communication device is not associated with an automatic locating device and if the received IP address does not match the prior IP address, the method further comprising:
    connecting the communication device to a data collection unit to perform the querying act.

11. A method as recited in claim 9, wherein the automatic locating device is a Global Positioning System ("GPS").

12. A method as recited in claim 9, wherein the updating act comprises:
    converting the current set of physical location coordinates to address information useful in dispatching emergency personnel.

13. A method as recited in claim 9, wherein if the communication device is not associated with an automatic locating device and if the received IP address does not match the prior IP address, the registering act comprising:
    replacing physical location information contained in the physical location record with the current physical location information.

14. A method as recited in claim 9, wherein if the communication device is associated with an automatic locating device and if the current set of physical location coordinates are different from contained set of physical location coordinates, the updating act comprising:
    replacing the contained set of physical location coordinates with the current set of physical location coordinates.

* * * * *